United States Patent
Ventres

(10) Patent No.: US 6,415,206 B1
(45) Date of Patent: Jul. 2, 2002

(54) METHOD FOR DETERMINING A MINIMAL SET OF ROTOR BLADE ADJUSTMENTS

(75) Inventor: C. Samuel Ventres, Winchester, MA (US)

(73) Assignee: Simmonds Precision Products, Inc., Charlotte, NC (US)

(*) Notice: Subject to any disclaimer, the term of this patent is extended or adjusted under 35 U.S.C. 154(b) by 0 days.

(21) Appl. No.: 09/512,690

(22) Filed: Feb. 24, 2000

(51) Int. Cl.$^7$ .................. G05D 23/00; G05B 13/00; G05B 15/00; G05B 21/00; G01M 1/38
(52) U.S. Cl. .................. 700/280; 700/28; 700/30; 700/31; 700/57; 700/74; 700/279; 702/56; 702/57; 73/660; 73/662; 244/17.11; 244/17.13; 244/17.23; 244/17.27
(58) Field of Search .................. 700/28–31, 280, 700/279, 46, 52, 53, 56, 57, 73, 74, 110; 702/56, 57; 73/660, 661, 662; 244/17.11, 17.13, 17.21, 17.23, 17.25, 17.27; 318/127, 128, 649; 310/51

(56) References Cited

U.S. PATENT DOCUMENTS

| | | | |
|---|---|---|---|
| 3,945,256 A | 3/1976 | Wilson et al. | 73/455 |
| 4,937,758 A | 6/1990 | Hayden et al. | 700/280 |
| 4,999,534 A | * 3/1991 | Andrianos | 310/51 |

(List continued on next page.)

FOREIGN PATENT DOCUMENTS

GB 2 1 59 484 A 5/1984

OTHER PUBLICATIONS

Ventres S. Hayden R E: "Rotor Tuning Using Vibration Data Only" American Helicopter Society 56th Forum, vol. 1, May 2–4, 2000, pp. 623–629.

(List continued on next page.)

Primary Examiner—Ramesh Patel
(74) Attorney, Agent, or Firm—James M. Rashid; Calfee, Halter & Griswold LLP

(57) ABSTRACT

A method for determining a minimal set of adjustments for the blades of a rotor supported by a supporting structure for reducing rotation-induced vibration in the supporting structure at at least one harmonic rotation order and/or for reducing track deviation while maintaining structure vibration over at least one harmonic order within an acceptable limit. In one embodiment, a relationship is established by which vibration of the supporting structure may be calculated at harmonic orders of rotor rotation from Fourier coefficients of adjustment, Fourier coefficients of unit vibration influence and Fourier coefficients of vibration measurements. Thereafter, a value is determined for each selected Fourier coefficient of adjustment that provides a desired virtual reduction of vibration of the supporting structure at the harmonic order of the selected Fourier coefficient of adjustment using the vibration relationship. A group of minimal sets of virtual blade adjustments are determined for each type based on the determined value of the corresponding selected Fourier coefficient of adjustment, and from the group, a minimal set of virtual blade adjustments of each type is determined based on its affect on the vibration relationship at at least one harmonic order of rotor rotation other than the harmonic order of the selected Fourier coefficient of adjustment. In another embodiment, track measurements are provided that are resolved into corresponding Fourier coefficients of track that are used to establish a relationship by which track of the rotating blades may be calculated. Thereafter, a value is determined for each selected Fourier coefficient of adjustment that provides a desired reduction of track deviation using the track relationship. A group of minimal sets of virtual blade adjustments is determined based on the determined values, and from the group, a minimal set of virtual blade adjustments is determined based on its affect on the vibration relationship.

36 Claims, 6 Drawing Sheets

U.S. PATENT DOCUMENTS

| | | | | |
|---|---|---|---|---|
| 5,049,795 A | * | 9/1991 | Moulds, III | 267/136 |
| 5,206,816 A | * | 4/1993 | Hill et al. | 702/56 |
| 5,316,240 A | * | 5/1994 | Girard et al. | 188/380 |
| 5,471,880 A | * | 12/1995 | Lang et al. | 702/56 |
| 5,815,307 A | * | 9/1998 | Arbore et al. | 359/326 |
| 5,990,712 A | * | 11/1999 | Corman et al. | 327/121 |
| 6,094,989 A | * | 8/2000 | Twerdochlib | 702/56 |
| 6,099,254 A | * | 8/2000 | Blaas et al. | 416/114 |
| 6,208,949 B1 | * | 3/2001 | Eatwell | 700/108 |

OTHER PUBLICATIONS

Staub T A. Ventres C S: "New Rotor Trim and Balance System for Helicopter Usage Monitoring" Proceedings of the 16th Symposium "Aircraft Integrated Monitoring Systems" Sep. 17–19, 1991, pp. 539–556.

Rosen A et al.: "Mathematical modelling of a helicopter rotor track and balance: theory" Journal of Sound & Vibration, GB. London, vol. 200, No. 5, Mar. 13, 1997, pp. 589–603.

* cited by examiner

METHOD FOR DETERMINING A MINIMAL SET OF ROTOR BLADE ADJUSTMENTS

BACKGROUND OF THE INVENTION

The present invention is directed to rotor track and balance methods, in general, and more particularly, to a method for determining a minimal set of adjustments for the blades of a rotor supported by a supporting structure for reducing rotation-induced vibration in the supporting structure at least one harmonic rotation order or for reducing track deviation while maintaining structure vibration over at least one harmonic order within an acceptable limit.

In the past, rotor track and balance methods were limited to minimizing rotation-induced vibration in a supporting structure, like a helicopter fuselage, for example, at only the fundamental harmonic order of the blade rotation which was considered the most problematic to the pilot and passengers. If the optimization process relied solely on vibration effects at the fundamental frequency, it could lead to a non-unique blade adjustment solution because blade track deviation was not taken into consideration. Therefore, to avoid ambiguities in the adjustment process, track measurements were considered a necessary addition to vibration processing to order to have an acceptable rotor track and balance procedure.

The concept of the U.S. Pat. No. 4,937,758 (the "'758 Patent"), entitled "Method and Apparatus For Reducing Vibration Over The Full Operating Range Of A Rotor And A Host Device" and issued on Jun. 26, 1990 proved that rotor track and balance could be performed uniquely without the need of blade track measurements, i.e. with vibration measurement data alone. The '758 Patent teaches minimizing rotation-induced vibration in the helicopter fuselage not only at the problematic fundamental rotation order, but at all relevant harmonic orders in order to uniquely specify the best combination of rotor blade adjustments of all of the available types, i.e. tabs. pitch rods and weights. While this approach lead to a very smooth operating aircraft with minimal track deviation, it spread the number of blade adjustments needed over all of the available types and the rotating blades. Practically, the approach resulted in a high maintenance solution especially with aircraft having six and seven blades. It was recognized that in many cases most of the benefit could be realized with only a few adjustments, the remainder of recommended adjustments affording only a marginal improvement.

Accordingly, a rotor track and balance method which leads to an improved maintenance solution from a practical standpoint while keeping vibration and track deviation at acceptable limits is desired. One such solution should keep the number of blade adjustments recommended to a minimum just so long as the resulting vibration and track conditions while not optimum are reduced to desired levels. Such a method(s) is(are) taught in the following specification.

SUMMARY OF THE INVENTION

In accordance with one aspect of the present invention, a method of determining a minimal set of rotor blade adjustments for a rotor comprising the steps of: providing measurements of vibration at predetermined locations on a supporting structure of the rotor; resolving the vibration measurements into a corresponding set of Fourier coefficients of vibration for at least one of the locations, each Fourier coefficient of vibration of the set corresponding to a harmonic order of rotor rotation; establishing a vibration model of said supporting structure comprising Fourier coefficients of unit vibration influence for the at least one location, the Fourier coefficients of unit vibration influence corresponding to harmonic orders of rotor rotation; establishing a set of Fourier coefficients of adjustment for at least one blade adjustment type, the set of Fourier coefficients of adjustment corresponding to a set of blade adjustments associated with each blade adjustment type, tile Fourier coefficients of adjustment corresponding to harmonic orders of rotor rotation; selecting a Fourier coefficient of adjustment from each blade adjustment type set; establishing a relationship by which vibration of said supporting structure may be calculated at harmonic orders of rotor rotation from the Fourier coefficients of adjustment, the Fourier coefficients of unit vibration influence and the Fourier coefficients of vibration measurements; determining a value of each selected Fourier coefficient of adjustment that provides a desired virtual reduction of vibration of the supporting structure at the harmonic order of the selected Fourier coefficient of adjustment using the vibration relationship; determining a group of minimal sets of virtual blade adjustments for each type based on the determined value of the corresponding selected Fourier coefficient of adjustment; and determining a minimal set of virtual blade adjustments from the group of each type based on its affect on the vibration relationship at at least one harmonic order of rotor rotation other than the harmonic order of the selected Fourier coefficient of adjustment.

In accordance with another aspect of the present invention, a method of determining a minimal set of rotor blade adjustments for reducing track deviation of the rotating blades while maintaining vibration of a supporting structure of the rotor over at least one harmonic order of rotor rotation within an acceptable limit, said method comprising the steps of: providing measurements of vibration at predetermined locations on the supporting structure; resolving the vibration measurements into a corresponding set of Fourier coefficients of vibration for at least one of the locations, each Fourier coefficient of vibration of the set corresponding to a harmonic order of rotor rotation; providing measurements of track of the rotating blades; resolving the track measurements into corresponding Fourier coefficients of track that correspond to harmonic orders of rotor rotation; establishing a vibration model of the supporting structure comprising Fourier coefficients of unit vibration influence for the at least one location, the Fourier coefficients of unit vibration influence corresponding to harmonic orders of rotor rotation; establishing a track model for the rotating blades comprising Fourier coefficients of unit track influence, the Fourier coefficients of unit track influence corresponding to harmonic orders of rotor rotation; establishing a set of Fourier coefficients of adjustment for at least one blade adjustment type, the set of Fourier coefficients of adjustment corresponding to a set of blade adjustments associated with each blade adjustment type, the Fourier coefficients of adjustment corresponding to harmonic orders of rotor rotation; selecting a Fourier coefficient of adjustment from each blade adjustment type set; establishing a relationship by which vibration of the supporting structure may be calculated at harmonic orders of rotor rotation from the Fourier coefficients of adjustment, the Fourier coefficients of unit vibration influence and the Fourier coefficients of vibration measurements; establishing a relationship by which track of the rotating, blades may be calculated at harmonic orders of rotor rotation from the Fourier coefficients of adjustment, the Fourier coefficients of unit track influence and the Fourier coefficients of track measurements; determining a value of each selected Fourier coefficient of adjustment that provides a desired virtual reduction of track deviation of the rotating blades at the harmonic order of the selected Fourier coefficient of adjustment using the track relationship; determining a group of minimal sets of virtual blade adjustments for each type based on the determined value of the corresponding selected Fourier coefficient of adjustment; and determining a minimal set of virtual blade adjustments from the group of each type based on its affect on the vibration relationship at at least one harmonic order of rotor rotation other than the harmonic order of the selected Fourier coefficient of adjustment.

DESCRIPTION OF THE PREFERRED EMBODIMENT

Figure 1:
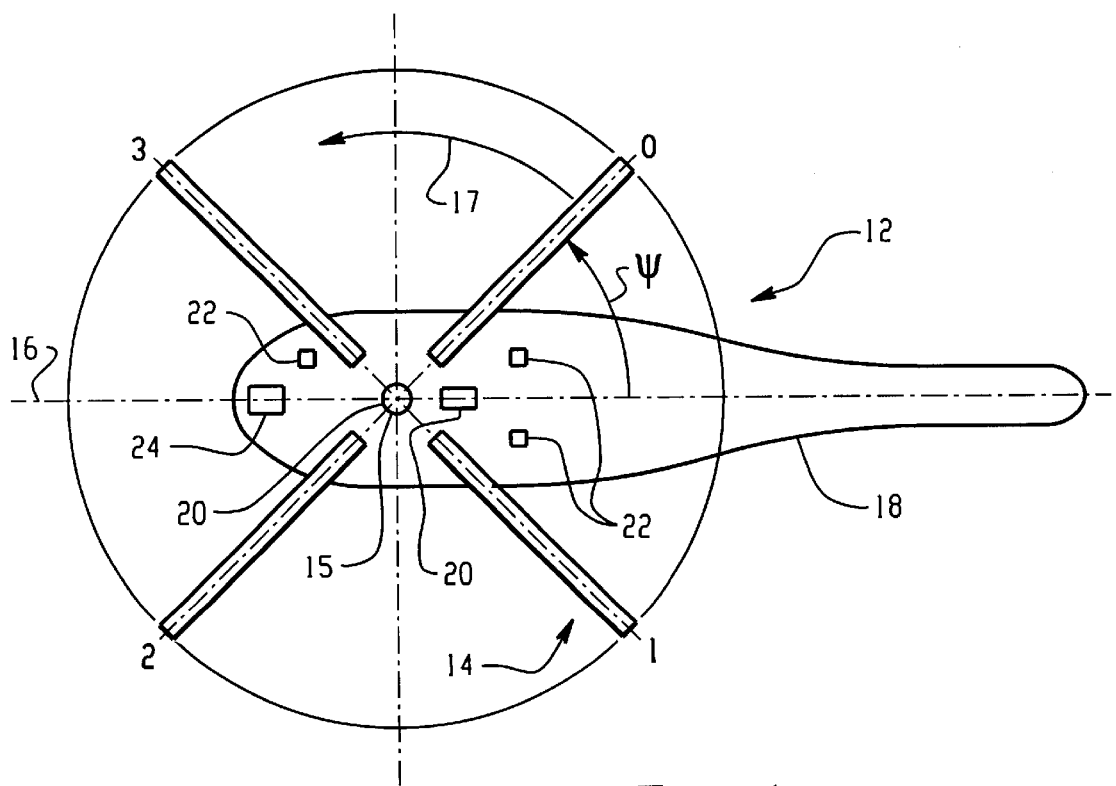
FIG. 1 depicts a suitable environment for embodying the present invention.

A suitable environment for embodying the present invention is a helicopter 12 such as that shown by way of example in the top view illustration of FIG. 1. Referring to FIG. 1, the exemplary helicopter 12 has four rotating blades 14 attached to a rotor 15 that is supported by the fuselage 18 which is the supporting structure for the current embodiment. It is understood that other types of supporting structures may be used without deviating from the intended scope of the present invention. In addition, while the helicopter of the instant embodiment has four blades, it is further understood that the rotor 15 may have more than four blades and the principles of the present invention still still apply. Four blades are only being used as an example in describing the instant embodiment which is not limiting in any way.

In the present embodiment, the blades 14 of the helicopter 12 are indexed 0 through 3 in a direction counter to the rotation direction of the blades shown by the arrowed line 17. More generally. the blades 14 may be indexed b=0 to B-1, where B is the total number of blades attached to the rotor 15. Blade 0 may be designated as the reference blade for this example and the position $\psi$ of the reference blade 0 is measured from the centerline 16 of the helicopter aft of the rotor. A conventional shaft position indicator 20, like a tachometer, for example, may be disposed on the helicopter 12 at the rotor to detect the angular position of the rotor shaft 15. Since the blades are attached to the rotor at fixed positions and equally spaced from one another, the positions of any blade b may be measured by the shaft position indicator 20 and expressed as $\psi_b=\psi+b\Delta$, where $\Delta=2\pi/B$, the interblade spacing. The rate of rotation of the rotor 15 is governed to be substantially constant which implies that the azimuth angle $\psi$ is proportional to time. Denoting the rate of rotation by $\Omega$, then $\psi=\Omega t$. Accordingly, blade forces and motion may be expressed as functions of $\psi$.

In addition. one or more sensors 22 may be disposed at different locations on the supporting structure to measure vibratory motion of the supporting structure induced by the rotating blades 14 via the rotor shaft 15. The sensors 22 used in the present embodiment are conventional accelerometers, but it is understood that other types of sensors may be used to measure rotation-induced vibration of the supporting structure, like strain gauges or a combination of strain gauges and accelerometers, for example. Some helicopters include an optical tracking device or tracker 24 on the supporting structure to measure the heights of the blades with respect to a reference point. A suitable optical tracking device for the present embodiment may be of the type manufactured by the Chadwick Helmuth Company, Inc., bearing model number 11800-3 (sometimes referred to under the trade name "Fastrak"). While the Chadwick device is preferred for the present embodiment, it is understood that other such devices could be used as substitutes without deviating from the broad principles of the present invention.

The aforementioned Chadwick device contains a converging optical lens which focuses an image of the blade on two light-sensitive diodes situated in the focal plane of the lens. As each blade passes over the tracker 24, its shadow obscures each diode in succession. From the electrical outputs of the two diodes, internal circuitry generates two brief electrical pulses, separated in time by an interval which is proportional to the straight-line distance from the tracker to the portion of the blade at which it is aimed. From the time interval between these pulses, plus some additional information on the geometry of the rotor system, the height above the tracker of a specific point on the blade (such as the blade tip) can be computed. Data from the tracker 24, if available, may be used with vibration data provided by the accelerometers 22 to enhance the techniques of rotor trimming and balancing in accordance with one aspect of the present invention.

Figure 2:
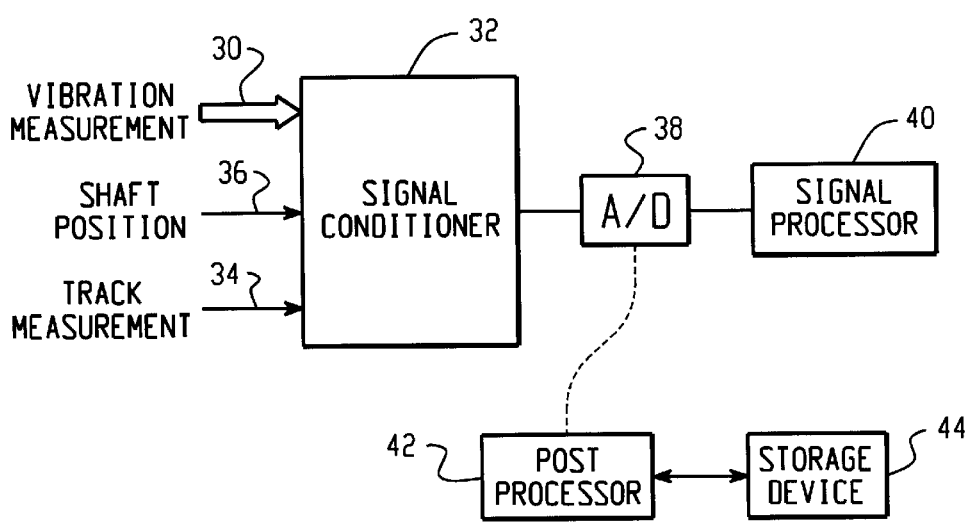
FIG. 2 is a simplified block diagram schematic of a rotor tuning system suitable for embodying the present invention.
Figure 3A:
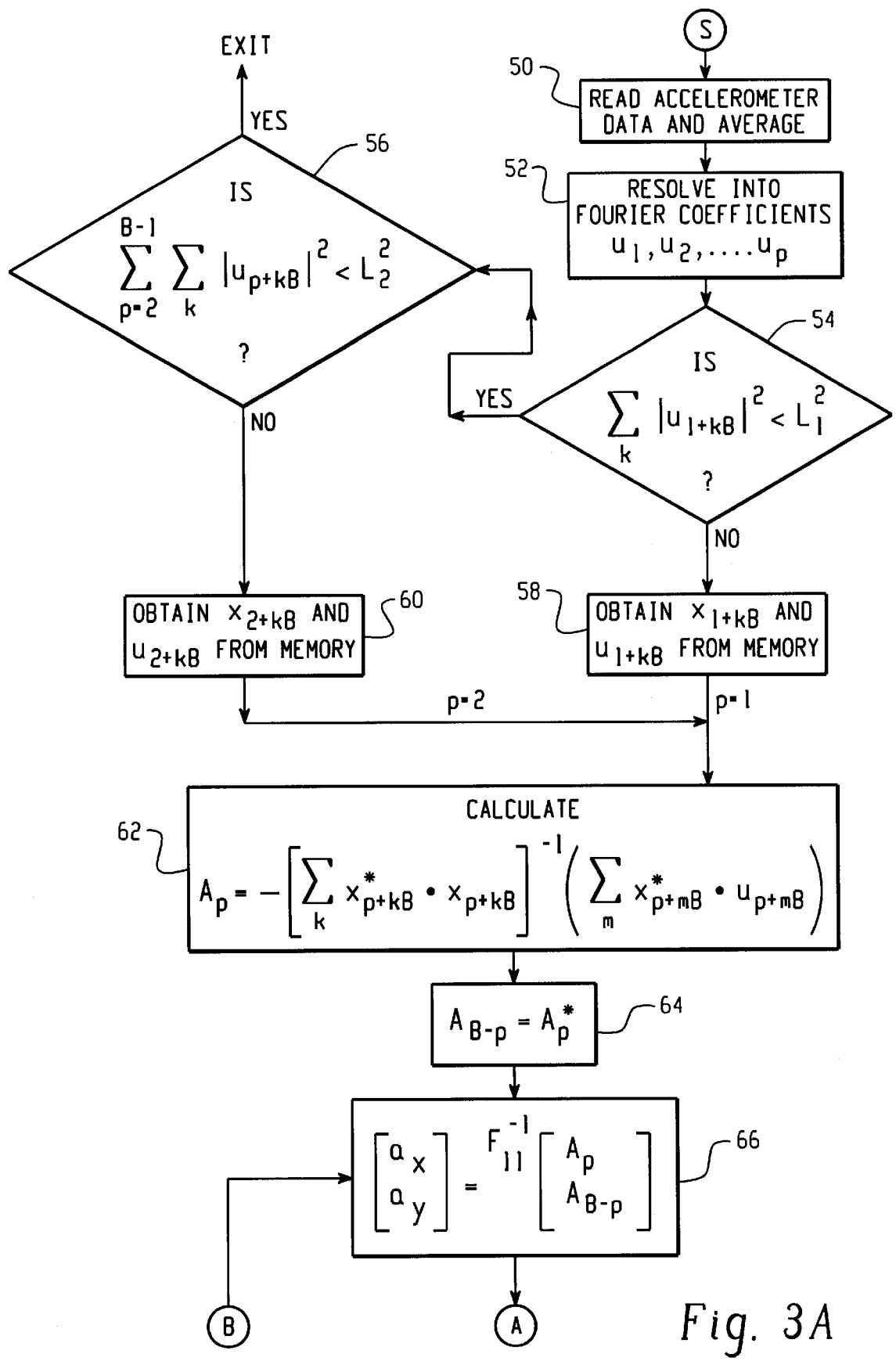
FIGS. 3A–3B in composite is a software flowchart suitable for use in programming one or more of the processors of the embodiment of FIG. 2 in accordance with one aspect of the present invention.
Figure 3B:
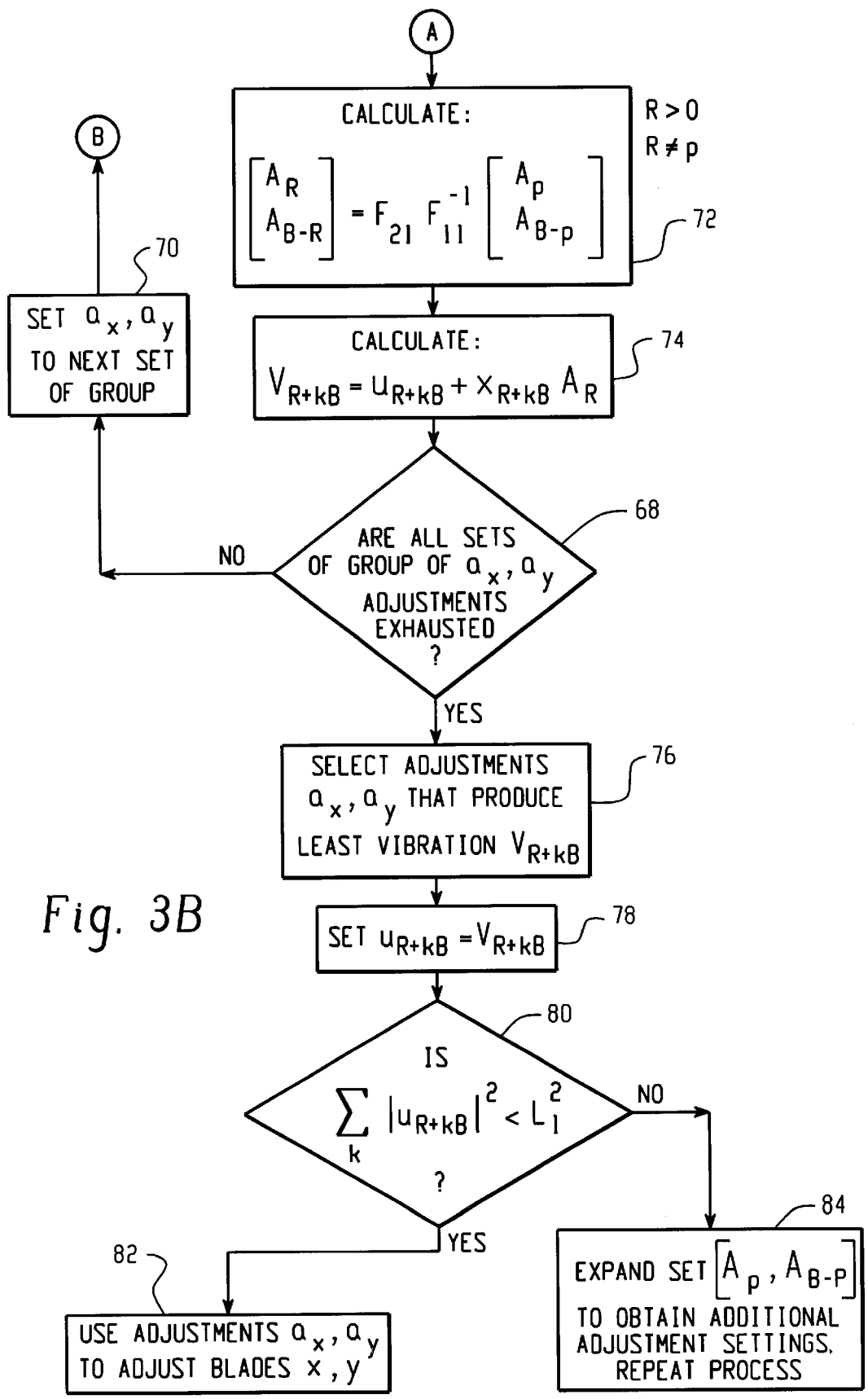

Generally, helicopters 12 include a system or systems for rotor tuning. One such rotor tuning system is disclosed in the U.S. Pat. No. 4,937,758 (hereinafter referred to as the "'758 Patent") which is incorporated by reference into the instant application for providing the details of structure and operation thereof. A simplified block diagram schematic of such a rotor tuning system is shown in FIG. 2. Referring to FIG. 2, vibration measurement signals 30 provided by the accelerometers 22 are coupled to a signal conditioning circuit 32. In addition, track measurement signals 34 provided by the tracker 24 and a shaft position signal 36 generated by the tachometer 20 are also coupled to the signal conditioner 32. The signal conditioner 32 includes conventional circuits (not shown) to preamplify, filter, shape, and gain adjust the signals 30,34 and 36. An analog-to-digital converter (A/D) 38 is also included to digitize the conditioned analog signals for processing by a signal processor 40. The processor 40 may be a digital signal processor comprised of a microprocessor, a floating point processor, a memory and appropriate input/output interface circuitry (all not shown). The processor 40 may also include digital filtering circuitry, but this function may also be embodied in the embedded software of the processor, as desired.

Generally, track and vibration data measurements are collected over one or more flights of the helicopter by the signal processor 40 via conditioner 32 and/or A/D 38 and stored in the memory thereof. The collected data may be further processed in the processor 40 by software programs embedded in the memory thereof to calculate a minimal set of adjustments for the rotor blades 14 as will become more apparent from the description hereinbelow. In the alternative, the collected data may be linked to a post processor 42 which may be, for the present embodiment, a laptop computer for calculating the minimal adjustment sets.

There are a variety of ways the collected vibration and track data may be linked to the post processor 42. For example, the collected data may be stored on a conventional memory card that may be plugged into the laptop 42 for processing by the software programs thereof. Such data may also be downloaded through a hard wired link or telecommunicated to the post processor 42 and stored in a storage device 44 thereof for further processing in accordance with an aspect of the present invention. For more details of the structure and operation of the afore-described system, reference is made to the '758 Patent that has been incorporated by reference herein.

The processing of track data 34, when or if it is used, may take several forms depending upon the format of the output signal of the tracker 24. In the case of the Chadwick-Helmuth "Fastrak" device cited earlier, the pair of electrical pulses emitted at each blade crossing are detected by suitable electrical circuitry. In the present embodiment, the arrival times of these pulses are recorded by latching one or more free-running counters that may be incorporated into the signal processor 40 or post-processor 42, for example, from which the time interval between their arrivals is computed. From this time interval, the height of the blade above the tracker, or above any convenient reference plane, may be computed. Generally pulse arrival-times are recorded for an interval of time corresponding to some twenty to sixty revolutions of the rotor. The heights computed for each blade may be averaged, blade-by-blade, to obtain average values for the height of each blade during the data acquisition interval.

In accordance with the present invention, the signal processor 40 and/or post processor 42 is or are programmed for resolving rotor blade adjustments and blade track deviations into spectral components (Discrete Fourier Transform coefficients) which relate directly to rotor and supporting structure vibration at various rotation orders of the rotor velocity. Based upon these resolutions, the processor(s) include programs for computing rotor adjustments which produce specified changes in vibration and/or track at a subset of the affected frequencies, while requiring only a minimal set of adjustments of each adjustment type for each harmonic order affected. With but few exceptions, the particular blades to be adjusted by the computed minimal set may be selected arbitrarily. A multiplicity of adjustment options may be determined and exploited by computing the vibration which results from each such choice. If the vibration from any of the choices is deemed acceptable at all relevant frequencies (according to criteria determined beforehand), then the corresponding set of blade adjustments provides an acceptable solution. If no such set is found, a procedure is presented for systematically increasing the number of blades adjusted (thereby increasing the number of frequencies at which vibration is reduced) until an acceptable solution is obtained.

In summary, the method which is programmed into the processor(s) determines a minimal set of rotor blade adjustments for reducing supporting structure vibration over at least one harmonic order of rotor rotation. In the present embodiment, the method comprises the steps of: providing measurements of vibration 30 at predetermined locations 22 on said supporting structure 12; resolving vibration measurements 30 into a corresponding set of Fourier coefficients of vibration for at least one of said locations 22, each Fourier coefficient of vibration of said set corresponding to a harmonic order of rotor rotation; establishing a vibration model of said supporting structure comprising Fourier coefficients of unit vibration influence for said at least one location, said Fourier coefficients of unit vibration influence corresponding to harmonic orders of rotor rotation; establishing a set of Fourier coefficients of adjustment for at least one blade adjustment type, said set of Fourier coefficients of adjustment corresponding to a set of blade adjustments associated with each blade adjustment type, said Fourier coefficients of adjustment corresponding to harmonic orders of rotor rotation; selecting a Fourier coefficient of adjustment from each blade adjustment type set; establishing a relationship by which vibration of said supporting structure may be calculated at harmonic orders of rotor rotation from said Fourier coefficients of adjustment, said Fourier coefficients of unit vibration influence and said Fourier coefficients of vibration measurements; determining a value of each selected Fourier coefficient of adjustment that provides a desired virtual reduction of vibration of said supporting structure at the harmonic order of said selected Fourier coefficient of adjustment using said vibration relationship; determining a group of minimal sets of virtual blade adjustments for each type based on said determined value of said corresponding selected Fourier coefficient of adjustment; and determining a minimal set of virtual blade adjustments from said group of each type based on its affect on the vibration relationship at at least one harmonic order of rotor rotation other than said harmonic order of said selected Fourier coefficient of adjustment.

The basis of the aforementioned method is the resolution of the adjustments of each particular type into frequency-related Fourier coefficients, via the Discrete Fourier Transform (DFT):

$$A_p = \sum_{b=0}^{B-1} a_b e^{-ibp\Delta} \quad (1)$$

whose inverse is $$a_b = \frac{1}{B}\sum_{p=0}^{B-1} A_p e^{ibp\Delta} \quad (2)$$

The blades are indexed 0 through B–1, starting with any blade and proceeding around the rotor opposite to the direction of rotation. The adjustment (of any particular type be it tab adjustment, pitch link adjustment, or weight adjustment, for example) on blade b is represented by $a_b$ and $\Delta=2\pi/B$ is the azimuth angle between adjacent blades, or interblade spacing.

Except for $A_0$ and $A_{B/2}$ the DFT coefficients are complex numbers. They are conjugate-symmetric about B/2 ($A_{B-p}=A_p^*$), so only the set of coefficients $A_p$ whose subscripts do not exceed B/2 are required to determine the adjustments uniquely. This symmetry can be used to reduce the number of elements in the inverse equation.

The DFT representation of the blade adjustments simplifies both the relationship between adjustments made to the rotor blades and the consequent changes in vibration recorded by sensors 22 mounted in the fuselage 12, and the relationship between these same blade adjustments and the change in the track, or height, of the blades, as recorded by an optical or other tracking device 24.

In the past, both types of data, vibration and track, have been used separately for rotor balancing or rotor tuning, or rotor track and balance, as the process has variously been called. Another aspect of the present invention is a method to provide systematic and rational steps for combining the two distinct types of data, when both are available, into a single algorithm, as well as to disclose a variation of the algorithm which succeeds with vibration data only.

In accordance with this aspect of the present invention, a method of determining a minimal set of rotor blade adjustments for reducing track deviation of said rotating blades while maintaining vibration of said supporting structure over at least one harmonic order of rotor rotation within an acceptable limit is programmed into the processor(s). In one embodiment, this method comprises the steps of: providing measurements of vibration 30 at predetermined locations 22 on said supporting structure 12; resolving said vibration measurements into a corresponding set of Fourier coefficients of vibration for at least one of said locations, each Fourier coefficient of vibration of said set corresponding to a harmonic order of rotor rotation; providing measurements of track of said rotating blades; resolving said track measurements into corresponding Fourier coefficients of track that correspond to harmonic orders of rotor rotation; establishing a vibration model of said supporting structure comprising Fourier coefficients of unit vibration influence for said at least one location, said Fourier coefficients of unit vibration influence corresponding to harmonic orders of rotor rotation; establishing a track model for said rotating blades comprising Fourier coefficients of unit track influence, said Fourier coefficients of unit track influence corresponding to harmonic orders of rotor rotation: establishing a set of Fourier coefficients of adjustment for at least one blade adjustment type, said set of Fourier coefficients of adjustment corresponding to a set of blade adjustments associated with each blade adjustment type, said Fourier coefficients of adjustment corresponding to harmonic orders of rotor rotation; selecting a Fourier coefficient of adjustment from each blade adjustment type set; establishing a relationship by which vibration of said supporting structure may be calculated at harmonic orders of rotor rotation from said Fourier coefficients of adjustment, said Fourier coefficients of unit vibration influence and said Fourier coefficients of vibration measurements; establishing a relationship by which track of said rotating blades may be calculated at harmonic orders of rotor rotation from said Fourier coefficients of adjustment, said Fourier coefficients of unit track influence and said Fourier coefficients of track measurements; determining a value of each selected Fourier coefficient of adjustment that provides a desired virtual reduction of track deviation of said rotating blades at the harmonic order of said selected Fourier coefficient of adjustment using said track relationship; determining a group of minimal sets of virtual blade adjustments for each type based on said determined value of said corresponding selected Fourier coefficient of adjustment; and determining a minimal set of virtual blade adjustments from said group of each type based on its affect on the vibration relationship at at least one harmonic order of rotor rotation other than said harmonic order of said selected Fourier coefficient of adjustment.

To simplify the description of the relationships between blade adjustments and rotor vibration or track, an example will be discussed which considers only one type of rotor blade adjustment, such as a trailing edge tab, and only one flight condition, which need not be specified. Thief equations derived for this basic example can be generalized in a straightforward manner to accommodate rotors whose blades are fitted with several types of adjustments, and to include more than one flight condition.

A model may be established, by way of example, by letting the change in the vibration generated at a specific sensor location 22 within the fuselage 12 by an incremental adjustment of say 1° upward deflection of the trailing edge of the tab on the blade indexed b=0 be represented by the periodic function $x(\psi)$, where $\psi=\Omega t$ is the azimuth angle of that blade as measured by the tachometer 20. The vibration generated at the same location 22 by a similar deflection (i.e. 1 degrees upward deflection) on any blade b is then assumed to be $x(\psi-b\Delta)$. Accordingly, the change in supporting structure vibration generated by a set of such adjustments, in the amounts $$a_b, \ b = 0 \ldots B-1, \ \text{is} \ \sum_{b=0}^{B-1} x(\psi - b\Delta).$$

By the same reasoning, if $u(\psi)$ and $v(\psi)$ represent the vibration before and after making these adjustments, then $$v(\psi) - u(\psi) = \sum_{b=0}^{B-1} a_b x(\psi - b\Delta) \quad (3)$$

The import of this equation is that except for a phase shift, each blade reacts similarly to tab adjustments (or to adjustments of any other type). This approximation doesn't preclude small differences among the blades, it merely asserts that whatever differences do exist can be neglected in computing the response of each blade to the minute adjustments made for purposes of rotor tuning.

Further in the present embodiment, a track model is also programmed into the processor(s) to allow the height (track) of any blade be affected by adjustments on any of the blades. For example, let $\delta_0$ be the change in track of any blade due to a 1° tab bend adjustment on the same blade, $\delta_1$ be the change in track on any blade due to 1° tab bend on the blade immediately following it, and so on. More generally, $\delta_{b-c}$, the unit track influence coefficient, represents the change in height of any blade b due to a 1° tab bend on any other blade c. Then, letting $y_b$ and $z_b$ represent the heights of any blade b before and after making adjustments to all blades, $$z_b - y_b = \sum_{c=0}^{B-1} \delta_{b-c} a_b \quad (4)$$

Because of the circular geometry of the rotor, $\delta_{d+B}=\delta_d$, and so the terms on the right-hand side of EQ (4) form what is known variously as a cyclic, or circular, or periodic convolution product. Computing the DFT of each term in this equation simplifies it considerably, and introduces the DFT coefficients of the blade adjustments:

$$Z_p = Y_p + \Delta_p A_p \quad (5)$$

where $$\{Z_p \ Y_p \ \Delta_p\} = \sum_{b=0}^{B-1} \{z_b \ y_b \ \delta_b\} e^{-ip\Delta}$$

The role of the DFT representation of the blade adjustments in the vibration equation is revealed by noting that in steady flight each term in EQ (3) is periodic, and so can be represented by a Fourier series:

$$\{v(\psi) \quad u(\psi) \quad x(\psi)\} = \sum_s \{v_s \quad u_s \quad x_s\}e^{is\psi}$$

Using these definitions, EQ (3) can be written as follows:, $$v_N = u_N + x_N A_N$$

Fourier coefficients $u_N$, $v_N$ may be computed in the present embodiment by synchronously averaging vibration data 30 collected from accelerometers 22 or other sensors mounted in the airframe 12, are defined as follows:

$$\{u_s \quad v_s\} = \frac{1}{N}\int_0^{2\pi N}\{u(\psi) \quad v(\psi)\}e^{-is\psi}d\psi \quad (6)$$

where T is the rotation period of the rotor, and N is the number of revolutions of the rotor over which the data are averaged. One method of computing these Fourier coefficients from records of vibration data acquired simultaneously with the signal emitted by a once-per-revolution rotor shaft indexing sensor 20 are disclosed in the '758 Patent. A variation of this procedure, known as time-domain synchronous signal averaging, also may be used. In this procedure, the output of the synchronous signal averaging process is a single time-domain record for each vibration sensor 22, constructed by averaging, element-by-element, values interpolated from each vibration record at corresponding shaft azimuth angles during the N revolutions of the rotor. Approximations to the Fourier coefficients in EQ (6) are obtained by selecting the appropriate element in the Discrete Fourier Transform of each such synchronous signal average.

Recall that DFT coefficients $A_N$, which are computed from a finite set of blade adjustments are periodic in s. On the other hand, Fourier coefficients $u_N$, $v_N$, $x_S$, which are computed from continuous vibration data, are conjugate symmetric about s=0 ($u_{-N}=u_N{}^*$) but are not periodic. Setting s=p+kB, where k is any integer whatsoever, makes the point that DFT coefficient $A_p$ affects vibration at many rotation orders:

$$v_{p+kB} = u_{p+kB} + x_{p+kB}A_p \quad (7)$$

Another way to write Equation (7) is:

$$v_N = u_N + x_N A_{N \bmod B} \quad (8)$$

The notation "s mod B" means "that integer in the interval 0 . . . B–1 which differs from s by a multiple of B".

Fourier coefficients of unit track influence and unit vibration influence may be determined directly from Equations (5) and (8), respectively, using data collected during a carefully conducted sequence of flights interspersed by known adjustments to the rotor. During these flights, at the appropriate operating condition(s), vibration and track data may be collected and processed into the requisite components of vibration and track, as discussed above. Equations (5) and (8) may be then solved for the Fourier coefficients of unit track influence $\Delta_p$ and unit vibration influence $x_S$, i.e., $$\Delta_p = (Z_p - Y_p)/A_p$$

$$x_N = (v_N - u_N)/A_{N \bmod B}$$

To achieve accurate results, large adjustments should be used. In the example cited, this means in effect the largest tab bend(s) which can be implemented without exceeding whatever vibration and/or track limits imposed by the operator's manual. In most cases the tab on a single blade can be used (it doesn't matter which blade is selected), because such a single bend generates DFT coefficients of equal magnitude for all adjustment orders. That is, if the tab on blade b is adjusted, $A_p = a_b e^{ib\Delta}$, so $|A_p| = a_b$ for all adjustment orders p=0 . . . B–1. In most cases, however, limits are imposed only on the fundamental vibration, so in the interest of achieving the largest possible tab bends, it may be advantageous to schedule additional tests with adjustments to the tabs on two (or more) blades at the same time, selecting the blades and the size/sign of the adjustments so that the fundamental component $A_1$ is small (or zero), while the components at higher harmonics are large.

Because many harmonic orders of vibration are affected by each DFT coefficient of the adjustments, the proper metric of the components rotor vibration governed by DFT coefficient $A_p$ is the sum of the squares of the vibration at all associated rotation orders, $$\sum_k |v_{p+kB}|^2 = \sum_k |u_{p+kB} + x_{p+kB}A_p|^2,$$

wherein the index k is summed over all integers. In practice this sum can be restricted, because rotors normally develop significant vibration only at low rotation orders $|s|=p+kB|$. It may not be appropriate, however, simply to neglect all terms k≠0. If the fuselage has a natural mode of oscillation very near a certain rotation order the vibration at that order might turn out to be significant. As an example, one known seven-bladed heavy utility helicopter has a fuselage bending mode at a frequency very near the fourth rotation order (s=±4) of the main rotor. This mode is excited by rotor adjustments which have a pronounced third-order component $A_3$:[–4=3+(–1)*7].

The '758 Patent discloses how to use vibration data to compute blade adjustments, with no reliance on track data. The method is to compute $A_p(=A_{B-p}{}^*)$, $1 \leq p \leq B/2$, so as to minimize $|u_p + x_p A_p|^2$. An alternative method, disclosed in the same patent, is to compute the solution at the fundamental ($A_1$) to minimize $|u_1 + x_1 A_1|^2$, but set the DFT coefficients at all higher orders to zero. Such adjustments minimize vibration only at the fundamental, leaving higher frequency components unchanged.

With either procedure, once suitable Fourier coefficients of adjustment $A_p$ have been determined, the corresponding blade adjustments are computed from EQ (2). The first term in this equation represents an adjustment common to all blades. In the referenced '758 patent it is specified that this term be set to zero, $$a_b = \frac{1}{B}\sum_{p=1}^{B-1} A_p e^{ipb\Delta} \quad (9)$$

Adjustments computed from this equation always sum to zero ($\Sigma a_b=0$), and so generally involve adjustments to all blades.

The methods of the present invention offer improvements over the invention of the '758 Patent by: (1) computing DFT coefficients $A_p$, p =2 . . . B–2 so as to reduce or minimize the corresponding DFT components of the track deviation [EQ (5)], while computing DFT coefficient $A_{1(=A_{B-1}{}^*)}$ to reduce or minimize the fundamental rotor vibration, (2) computing a specific DFT coefficient $A_p$ so as to reduce vibration at one or more associated frequencies in the set $s=p+kB, k=\pm 1, \pm 2, \ldots$, instead of computing $A_p$ only to reduce the vibration only at rotation order $s=p$, and (3) reducing the number of adjustments required by restricting the number of DFT coefficients specified. Coefficients not specified may be treated as variables with which to satisfy other requirements.

(a) Using Track Data to Complement Vibration Data

When track data is available, it may be used to compute DFT coefficients $A_p$, $p=2\ldots B-1$ to minimize substantially $|Z_p|^2 = |Y_p + \Delta_p A_p|^2$. If a least-squares minimization technique is used, then a unique $A_p$ solution is expressed as:

$$A_p = -(\Delta_p^* \Delta_p)^{-1}(\Delta_p^* Y_p)$$

(b) Reducing Vibration at One or More Associated Frequencies

If vibration of the supporting structure is to be reduced to a predetermined limit at at least one harmonic order frequency, the method includes one or more such frequencies in the expression for the vibration metric to be minimized. The general solution, including all associated frequencies, is obtained by computing $A_p$ so as to minimize $$\sum_k |u_{p-kB} + x_{p+kB} A_p|^2.$$

The solution is $$A_p = -\left(\sum_k x_{p+kB}^* x_{p+kB}\right)^{-1}\left(\sum_m x_{p+mB}^* u_{p+mB}\right)$$

Where appropriate, indices k and m can be restricted to any desired subset of the integers.

(c) Minimizing the Number of Adjustments of Each Type

Matrix notation is helpful and will be used in explaining, by example, the full scope of the method steps in determining a minimal set of rotor blade adjustments. In this example, the blade adjustments and their Fourier transform coefficients are combined into vectors, $$a = [a_0 \ldots a_{B-1}]^T$$
$$A = [A_0 \ldots A_{B-1}]^T$$

which allow the original DFT equation [EQ (1)] to be recast in matrix form:

$$A = Fa \quad (10)$$

Square matrix F has elements $F_{pb} = e^{-ipb\Delta}$, $p,b = 0 \ldots B-1$. It is nonsingular so if either $a$ or $A$ is specified, the other can be computed.

Suppose that both the adjustment orders $p = 0 \ldots B-1$ and blade indices $b = 0 \ldots B-1$ are partitioned into two sets, $[p_1, p_2]$ and $[b_1, b_2]$, such that $p_1$ contains the same number of elements as $b_1$, and $p_2$ contains the same number of elements as $b_2$. These subsets need not be contiguous, either as to blade index or rotation order. However, the elements of A are not independent (recall $A_{B-p} = A_p^*$), so if a specific rotation order $p$ is placed in $p_1$, its image order $B-p$ must be as well, and similarly for $p_2$. Because $A_0$ is never significant for rotor tuning, rotation order $p=0$ is always assigned to $p_2$.

The vector of blade adjustments is partitioned ($a = [a_1, a_2]$) so as to correspond element-by-element with $[b_1, b_2]$, and the vector of DFT coefficients is partitioned ($A = [a_1, a_2]$) to correspond with $[p_1, p_2]$. By this means EQ (10) is partitioned as well:

$$A_1 = F_{11} a_1 + F_{12} a_2$$
$$A_2 = F_{21} a_1 + F_{22} a_2$$

Matrix $F_{11}$, which contains those elements of F which correspond to rotation orders $p_1$ (columns) and blades $b_1$ (rows), is a square matrix. Providing that this matrix is nonsingular, the partitioned equations can be solved for $[a_1 A_2]$, as follows:

$$a_1 = F_{11}^{-1}(A_1 - F_{12} a_2) \quad A_2 = F_{21} F_{11}^{-1} A_1 + (F_{22} - F_{21} F_{11}^{-1} F_{12}) a_2 \quad (11)$$

By the argument just presented, adjustments $a_1$ produce the desired spectral changes $A_1$ at rotation orders $p_1$. Adjustments $a_1$, are implemented only on blades $b_1$; blades $b_2$ may be adjusted in any way whatsoever. One possibility is set the adjustments on these blades to zero:

$$a_1 = F_{11}^{-1} A_1 \quad A_2 = F_{21} F_{11}^{-1} A_1 \quad (12)$$

Another possibility is to compute the adjustments on these blades so their final settings have specific values. If the current settings on blades $b_2$ are denoted by $s_2^{(c)}$, and the final settings on the same blades by $s_2^{(f)}$, then obviously $a_2 = s_2^{(f)} - s_2^{(c)}$:

$$a_1 = F_{11}^{-1} A_1 - F_{11}^{-1} F_{12}(s_2^{(f)} - s_2^{(c)})$$
$$A_2 = F_{21} F_{11}^{-1} A_1 + (F_{22} - F_{21} F_{11}^{-1} F_{12})(s_2^{(f)} - s_2^{(c)})$$

Frequently it is preferred that as many blades as possible be held at some specific setting. In this case, the final settings in the equations above would be set to the value specified. For example, rotorcraft maintenance manuals commonly specify that as few blades as possible carry hub weights. This is accomplished by assigning $s_2^{(f)} = 0$:

$$a_1 = F_{11}^{-1} A_1 + F_{11}^{-1} F_{12} s_2^{(c)} \quad A_2 = F_{21} F_{11}^{-1} A_1 - (F_{22} - F_{21} F_{11}^{-1} F_{12}) s_2^{(c)} \quad (13)$$

Generally, in using these solutions, it necessary to confirm that the settings on blades $b_1$ are tenable. In the hub weight example cited, only nonnegative hub weight settings make sense, so only those solutions for which $s_1^{(f)} = s_1^{(c)} + a_1 \geq 0$ are acceptable. Such considerations reduce the size of the set $a_1$, and in some cases no solutions may be acceptable.

In summary, EQS (12) minimize the number of blades which have to be adjusted, while EQS (13) minimize the number of blades with nonzero final settings, in both cases while providing the mandated spectral changes $A_1$.

In either case, spectral artifacts $A_2$ must be accepted as the consequence of manipulating blades $b_2$ to accomplish ends other than the reduction of vibration or track. Recall that $b_1$ will contain as many elements as $p_1$, and further that $F_{11}$ will be nonsingular. As it turns out, all square sub-matrices of DFT matrices of odd dimensions (odd number of blades) are nonsingular. While this is not true of DFT matrices of even dimensions, in fact most such submatrices are nonsingular. The upshot is that there are many possible choices for the blades to be adjusted, and each such choice produces a different set of artifacts $A_2$. If for any of the choices, the residual vibration (or track) at all rotation orders $1 \leq p \leq B/2$ is deemed to be acceptable, then the corresponding set of blade adjustments provides an acceptable solution. On the other hand, if the residual vibration (or track) at one or more of the rotation orders in set $p_2$ are judged to be excessive, these orders can be transferred from $p_2$ to $p_1$, and the computations repeated. The effect is to widen the 'bandwidth' of the adjustments, involving more blades but reducing vibration (or track) at more frequencies. Carried to conclusion, this procedure either terminates with an acceptable (and minimal) set of blade adjustments, or exhausts all possibilities, wherefore no set of adjustments would achieve the desired goals.

Any algorithm suitable for programming into the processor(s) of the present embodiment assumes that two limits have been assigned to rotor vibration (or blade track).

A limit on all components of vibration controlled by DFT coefficient $A_1(=A_{B-1}{}^*)$:

$$\left\{\sum_k |u_{1+kB}|^2\right\}^{1/2} < L_1$$

For rotors with four or more blades, independent limits on the harmonics of vibration or track controlled by DFT coefficients $A_2(=A_{B-2}{}^*)$, $A_3(=A_{B-3}{}^*)$, and so on:

$$\left\{\sum_k |u_{p+kB}|^2\right\}^{1/2} < L_p \text{ OR } |Y_p| < T_p \text{ where } 2 \leq p \leq B/2$$

With regard to limit $L_1$ above, it should be understood that in most cases the vibration at the fundamental dominates all non-blade-rate ($p \neq kB$) components, and normally the fundamental is the only component of vibration specifically limited in rotorcraft operations manuals. Usually the vibration at the associated rotation orders is much smaller, so including them in the criterion has little affect on the balance solution.

Limits $L_p$, $p \geq 2$, are imposed on components of vibration which are rarely considered to be detrimental, although there is increasing awareness within the rotor tuning community that increased levels of vibration at intermediate rotation orders ($2 \leq p \leq B-1$) are caused by rotor tuning adjustments, and on occasion lead to crew discomfort. Imposing these limits is preferred to the method, moreover, because if no such limits are imposed, large blade track deviations may be produced. The alternative, where available, is to explicitly limit the magnitude of the track resolved at the same orders (limits $T_p$).

A suitable algorithm is defined by steps (1) through (9), below. Steps (1) and (2) provide initialization and requisite data for steps (3) through (9), which are executed as a loop. The loop exit is at statement (3), either with both limits satisfied, meaning that an acceptable solution has been computed, or with set $p_2$ reduced to adjustment order 0 only, indicating that no solution is possible.

1) Assign $a_1 \leftarrow 0$, $p_1 \leftarrow [\ ]$ (null set), and $p_2 \leftarrow [0 \ldots B-1]$.
2) Fetch the Fourier coefficients, $u_p$, of the current vibration at all required rotation orders. If track data is being used, fetch the DFT coefficients of the current blade track, $Y_p$, as well.
3) Compute the vibration metrics for $L_1$ and $L_p$ or $T_p$, $p>1$. If all metrics are within their respective limits, or if $p_2=[0]$, EXIT.
4) If limit $L_1$ is exceeded and rotation orders [1, B-1] are in $p_2$, transfer them to $p_1$.
5) If limits $L_p$ or $T_p$, $p>1$ is exceeded, transfer from $p_2$ to $p_1$ the rotation order pair [p, B-p] of the predominant vibration or track in the range $2 \leq p \leq B-2$ (that is, the rotation order which produces the largest value of $\Sigma_k |u_{p+kB}|^2$ or $|Y_p|^2$), as appropriate.
6) Compute optimal values for the DFT coefficients in vector $A_1$. Specifically, for each rotation order in $P_1$, If vibration is to be minimized, $$A_p = -\left(\sum_k x^*_{p+kB} x_{p+kB}\right)^{-1} \left(\sum_m x^*_{p+mB} u_{p+mB}\right)$$

else if track is to be minimized, $$A_p = -(\Delta_p{}^* \Delta_p)^{-1}(\Delta_p{}^* Y_p)$$

7) Determine all partitions $[b_1, b_2]$ compatible with $[p_1, p_2]$. If the rotor has an even number of blades, eliminate all partitions which produce singular submatrices $F_{11}$.
8) Using EQS (12), compute adjustments $a_1$ and spectral artifacts $A_2$ corresponding to each of the partitions arrived at in the previous step.
9) For each set of adjustments computed in the previous step, compute the residual vibration, (and/or track) as predicted by EQ (5) [and/or EQ (7)]. From these select the set which produces the least vibration (or track) in the range $p_2$. For this set, assign $u_p \leftarrow v_p$ (and $Y_p \leftarrow Z_p$).
10) Return to step (3), and continue.

The flowcharts of FIGS. 3A–3B and 4A–4C provide a simplified stepwise flow of the methods of the present invention for use in programming the processor(s) of the embodiment described in connection with the schematic of FIG. 2. If track data is unavailable or not intended to be used, determining the minimal set of blade adjustments may be embodied by the flowchart of FIGS. 3A and 3B in which program execution starts with blocks 50 and 52. The reading and averaging of the vibration sensor data, preferably provided by the accelerometers 22, of block 50 is generally performed over one or more flights of the helicopter and may be conducted in the signal processor 40. The resolution of the accelerometer data into Fourier coefficients as described hereabove is performed by instructional block 52 either in processor 40 or post processor 42. Decisional blocks 54 and 56 establish the vibration metrics within the respective limits L1 and L2. If the limit L1 is exceeded as determined by block 54, then the harmonic orders of 1, B–1are chosen, the Fourier coefficient A1 is selected, and the Fourier coefficients of $U_{1+kB}$ and $X_{1+kB}$ are obtained from memory in block 58. On the other hand, if the limit L2 is exceeded, then for the instant example, the harmonic orders p, B–p (where p=2) is chosen; the Fourier coefficient A2 is selected, and the Fourier coefficients $X_{2+kB}$ and $U_{2+kB}$ are obtained from memory in block 60. If neither of the limits L1 or L2 is exceeded then the program exits.

While the present example allows for execution of the track and balance algorithm upon exceedance of vibration limits according to predetermined vibration metrics, it is understood that the algorithm may be executed for any number of reasons including pilot or passenger observation of undesirable vibration, aircraft specified maintenance after so many hours of flight conditions, and required after maintenance or repair, as specified. The processing of the vibration data itself may set a flag to initiate the rotor balance algorithm after a scheduled flight ends. In these cases, the harmonic order (p=1,2, . . . B–1) for reducing vibration is selected for use use for calculating $A_p$.

Returning to FIGS. 3A and 3B, a value for $A_p$ is calculated in block 62 for p=1 or p=2 in order to minimize substantially the vibration in the supporting structure at the selected harmonic orders p+kB. $A_{B-p}$ is set equal to the conjugate of $A_p$ in block 64, thus establishing the set $A_p$, $A_{B-p}$ of Fourier coefficients of adjustment. Note that since $A_p$ is a complex number with a real and an imaginary part, then it will take at a minimum a set of two adjustments $a_x$, $a_y$ in order to obtain a unique solution in the equation of block 66. Accordingly, the program determines a group of minimal sets of adjustments $a_x$, $a_y$ by determining the minimum number of virtual blade adjustments of each type that may be calculated from the determined value of the corresponding selected Fourier coefficient of adjustment $A_p$ with a unique solution; determining all possible blade adjustments of the minimum number for each type from the total number of blades of the plurality; grouping all said blade adjustment possibilities into minimal sets of virtual blade adjustments for each type; and calculating virtual blade adjustment values of the minimal sets of each group based on the determined value of the selected Fourier coefficient of adjustment of the corresponding group via blocks 66, 68 and 70.

Also, in blocks 72 and 74, a vibration value $V_{R+kB}$ based on the vibration relationship is calculated for each of the minimal sets $a_x$, $a_y$ of virtual blade adjustments of the group at at least one harmonic order R+kB other than the harmonic order p of the selected Fourier coefficient $A_p$. Next in block 76 a minimal set of blade adjustments are selected from each group based on the calculated values of vibration of the minimal sets of each group. In the present example, the adjustment set that produced the lowest vibration is chosen. In block 78, the Fourier coefficient of vibration measurement at the harmonic R+kB is set to the calculated value of the Fourier coefficient of vibration of the selected minimal set of adjustment and the vibration metric for the limit L1 is determined in the decisional block 80. Accordingly, the selected minimal set of adjustments are represented for use to adjust the blades x and y in block 82 if the limit L1 is not exceeded in decisional block 80.

Otherwise, in block 84, a second Fourier coefficient of adjustment $A_q$ is added to the set $A_p, A_{B-p}$ in order to expand the minimal set of adjustments and the program is repeated starting at block 62 wherein $A_q$ is calculated. In block 64, $A_{B-q}$ is set to the conjugate of $A_q$ and, the new set of selected Fourier coefficients become $\{A_p, A_{B-p}, A_q, A_{B-q}\}$ expanding the minimal set of adjustments to four and the processing continues as described above. Each time the calculated vibration value of the selected minimal set of blade adjustments exceeds the predetermined limit L1 as determine by the decisional block 80, an additional Fourier coefficient of adjustment is added to expand the set of selected Fourier coefficients of adjustment until all of the Fourier coefficients of adjustment of a blade adjustment type set have been selected. Failure to reduce the vibration to acceptable values using adjustment coefficients of all harmonics usually indicates a faulty rotor system.

Figure 4A:
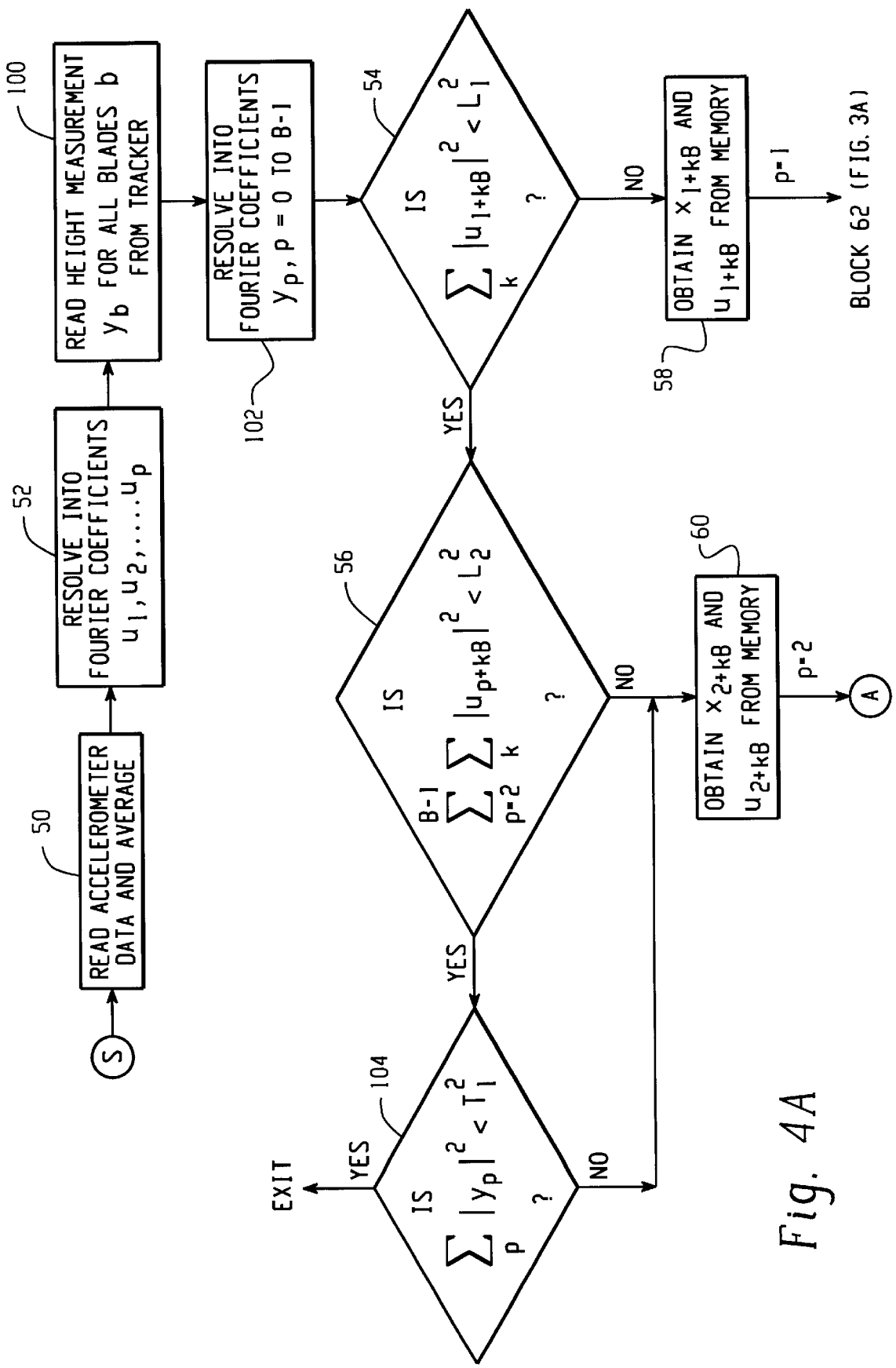
FIGS. 4A–4C in composite is a software flowchart suitable for use in programming one or more of the processors of the embodiment of FIG. 2 in accordance with another aspect of the present invention.
Figure 4B:
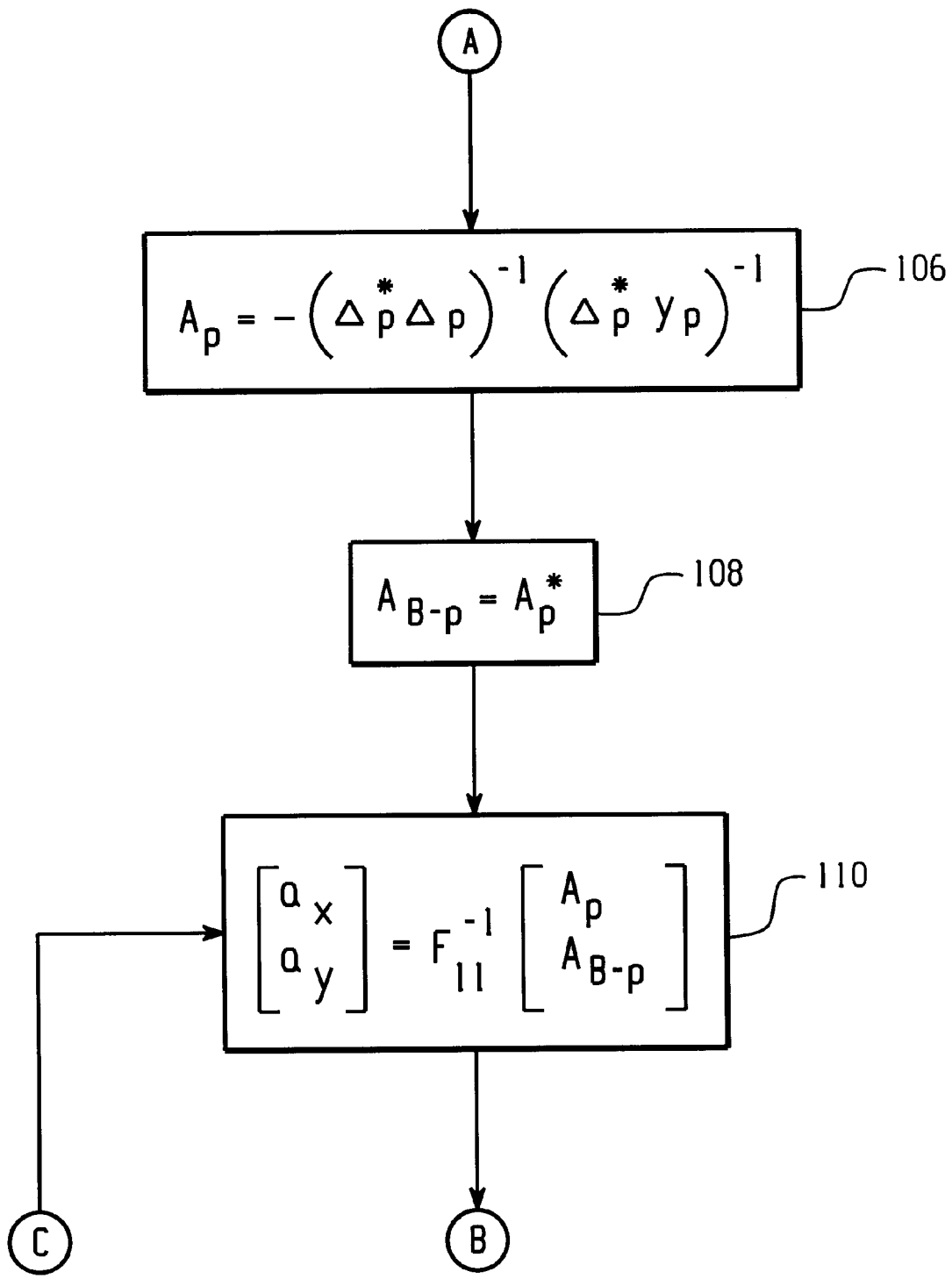
Figure 4C:
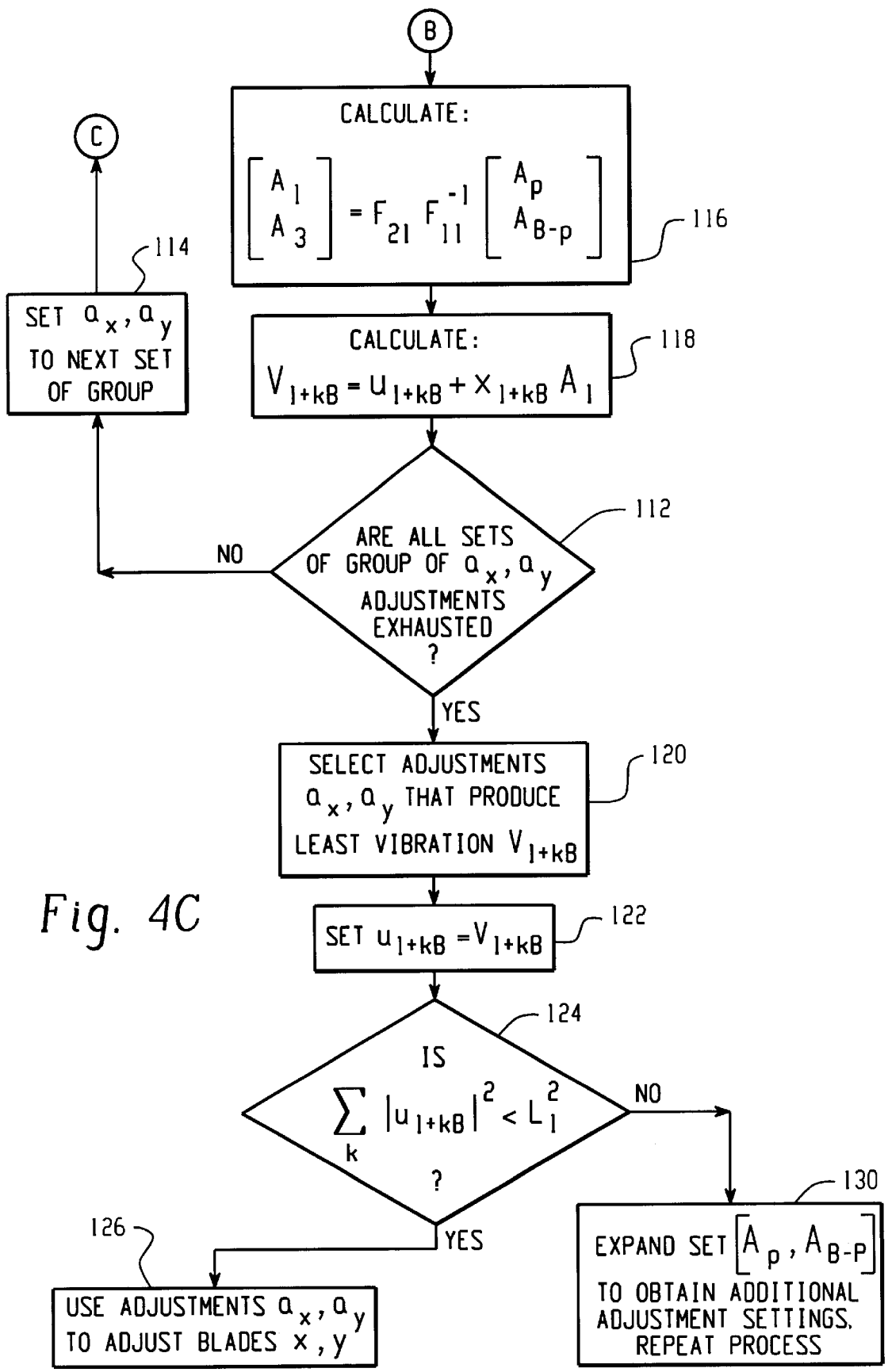

If the operator desires to use track data, when available, to determine the minimal set of blade adjustments, then the program of FIGS. 4A–4C may be executed. Like reference numbers will be used for instructional blocks that have been described above in connection with the flow diagram of FIGS. 3A–3B. Referring to FIGS. 4A–4C, the program execution starts at blocks 50 and 52 for the processing of vibration measurement data and continues at block 100 where the track data in the form of blade height measurements are collected from the tracker 24. The processing for converting the output signals of tracker 24 into averaged blade track (height) for each blade has been described previously. Next, in block 102, the track data, or in the present example, blade height measurements are resolved into Discrete Fourier coefficients, Yp, for p=0 to B−1. The vibration metrics are tested in blocks 54 and 56 and a track data metric is conducted by block 104. If the vibration limit L1 is exceeded as determined by the decisional block 54, the program execution continues at block 58 and onto block 62 of FIGS. 3A–3B as described above. If either the vibration limit L2 or track limit T1 is exceeded as determined by blocks 56 and 104, respectively, then program execution continues at block 60 wherein the harmonic orders p, B−p where p=2 is chosen, the Fourier coefficient $A_2$ is selected, and the Fourier coefficients $X_{2+kB}$ and $U_{2+kB}$ are obtained from memory. Thereafter the flowchart continues at block 106. If none of the vibration or track limits are exceeded, then the program exits.

In block 106, a value of the selected Fourier coefficient of adjustment $A_p$ (p=2) is calculated from an equation that minimizes substantially the track relationship at at least the harmonic order of the selected Fourier coefficient, i.e. p=2. For the present embodiment, a least squares technique is used for minimizing the track relationship as described hereinabove. Next. in block 108, $A_{B-p}$ is set to the conjugate of $A_p$ to establish the set $A_p$, $A_{B-p}$ for determining a group of minimal sets of blade adjustments $a_x$, $a_y$ in blocks 110, 112 and 114. Concurrently, for each minimal set of adjustments $a_x, a_y$, a value of the Fourier coefficient of adjustment at the fundamental harmonic A1 is calculated in block 116 and therefrom, a value of the Fourier coefficient of vibration $V_{1+kB}$ is calculated in block 118. Thus, the affect each virtual set of blade adjustments determined from the track relationship has on the vibration at the fundamental harmonic order is computed. In block 120, a minimal set of adjustments is selected from the group based on the affect each set has on the calculated vibration at the fundamental vibration frequency. In this embodiment, the set that produces the lowest or least vibration at the fundamental frequency is selected. In block 122, the Fourier coefficient of vibration measurement at the harmonic 1+kB is set to the calculated value of the Fourier coefficient of vibration of the selected minimal set of adjustment and the vibration metric for the limit L1 is decided in the decisional block 124. Accordingly, the selected minimal set of adjustments are represented for use to adjust the blades x and y in block 126 if the limit L1 is not exceeded in decisional block 124.

Otherwise, in block 130, a second Fourier coefficient of adjustment $A_q$ is added to the set $A_p, A_{B-p}$ in order to expand the minimal set of adjustments and the program is repeated starting at block 106 wherein $A_q$ is calculated. In block 108, $A_{B-q}$ is set to the conjugate of $A_q$ and the new set of selected Fourier coefficients become $\{A_p, A_{B-p}, A_q, A_{B-q}\}$ expanding the minimal set of adjustments to four and the processing continues as described above. Each time the calculated vibration value of the selected minimal set of blade adjustments exceeds the predetermined limit L1 as determine by the decisional block 124, an additional Fourier coefficient of adjustment is added to expand the set of selected Fourier coefficients of adjustment until all of the Fourier coefficients of adjustment of a blade adjustment type set have been selected.

While for simplicity and clarity only a single vibration sensor is mentioned, the method generalizes readily to any number of sensors. In practice at least two sensors are preferred, so as to resolve rolling and/or lateral motions of the fuselage, caused primarily by mass imbalance in the rotor but also by pitch control rod adjustments, from vertical components of motion generated by both pitch control rods and tabs. In addition, while only one flight condition is mentioned in the discussion, an unlimited number of flight conditions can be accommodated by straightforward extensions of the equations presented. Successful rotor tuning usually requires adjustments which afford a compromise between conflicting requirements for smooth operation of the aircraft over its entire envelope of operation.

The method disclosed for partitioning the DFT matrix applies equally to the inverse matrix, and as well to variants of either the DFT matrix or its inverse which involve only real-valued elements. The solutions obtained by all such variations are mathematically identical. All such variations are considered part of the present invention. Some square sub-matrices of DFT matrices of even dimension are singular, as are the corresponding partitions of the variants mentioned above. Several numerically robust methods for detecting such singularities are available. One such method is to compute the singular values of the submatrix (there will be one such for each row or column). If any of the singular values are comparable in size to the so-called floating point precision of the host device (computer), then the matrix is singular.

Also, the number of distinct adjustment sets comprised of n blades on a rotor with B blades in all is given by the Binomial coefficient $$\left\{ \begin{array}{c} B \\ n \end{array} \right\} = \frac{B!}{(B-n)!n!}.$$

As an illustration of the application of this formula to the algorithm, consider a rotor with seven blades, each fitted with hub weight, pitch control rod, and tab adjustments, and assume that the goal is to reduce only the fundamental (1/rev) vibration. Given the conjugate-symmetry of the DFT coefficients, set $p_1$ must contain orders [1 B−1]=[1 6]. and so each type of adjustment must be implemented on two blades. Among seven blades, $$\frac{7!}{(7-2)!2!} = 21$$

distinct blade-pairs can be formed. Thus there are 21 different ways to configure these pairs of tab, pitch control rod, and hub weight adjustments so as to produce specified changes in the vibration at the fundamental frequency. The same blades need not be used for the three types of adjustments, so in all there are $21^3$=9261 distinct triplets of blade-pairs to be considered. However, on most rotors hub weight adjustments have little effect on track, and have an appreciable effect only on fundamental vibration. Therefore the choice among the 21 possible hub weight adjustments is mute and must be decided on some other basis. However. both pitch rod and tab adjustments affect track and vibration at higher rotation orders, so the number of distinct adjustment sets of the second harmonic order through the sixth harmonic order artifacts to be considered in identifying the most desirable set of blade adjustments is $21^2$=441.

While the foregoing description of the preferred embodiment referred to only one type of rotor adjustment, i.e. trailing edge tabs, application of the various aspects of the present invention to other types of adjustments like pitch link and weight and the interdependence thereof is considered well within the capabilities of a person skilled in the pertinent art with reference to the description in the '758 Patent that is incorporated by reference herein. Accordingly, the present invention should not be limited to any embodiment thereof, but rather construed in breadth and broad scope in accordance with the recitation of the appended claims.

I claim:

1. A method of determining a minimal set of rotor blade adjustments for a rotor to which a plurality of rotating blades are attached, said rotor being supported by a supporting structure, said set of adjustments for reducing supporting structure vibration over at least one harmonic order of rotor rotation, said method comprising the steps of:

providing measurements of vibration at predetermined locations on said supporting structure;

resolving said vibration measurements into a corresponding set of Fourier coefficients of vibration for at least one of said locations, each Fourier coefficient of vibration of said set corresponding to a harmonic order of rotor rotation;

establishing a vibration model of said supporting structure comprising Fourier coefficients of unit vibration influence for said at least one location, said Fourier coefficients of unit vibration influence corresponding to harmonic orders of rotor rotation;

establishing a set of Fourier coefficients of adjustment for at least one blade adjustment type, said set of Fourier coefficients of adjustment corresponding to a set of blade adjustments associated with each blade adjustment type, said Fourier coefficients of adjustment corresponding to harmonic orders of rotor rotation;

selecting at least one Fourier coefficient of adjustment from each blade adjustment type set;

establishing a relationship by which vibration of said supporting structure may be calculated at harmonic orders of rotor rotation from said Fourier coefficients of adjustment, said Fourier coefficients of unit vibration influence and said Fourier coefficients of vibration measurements;

determining a value of each selected Fourier coefficient of adjustment that provides a desired virtual reduction of vibration of said supporting structure at at harmonic order of each selected Fourier coefficient of adjustment using said vibration relationship;

determining a group of minimal sets of virtual blade adjustments for each type based on said determined value of each selected Fourier coefficient of adjustment; and determining a minimal set of virtual blade adjustments from said group of each type based on its affect on the vibration relationship at at least one harmonic order of rotor rotation other than said harmonic order of each selected Fourier coefficient of adjustment.

2. The method of claim 1 wherein the vibration model is established for a supporting structure comprising a fuselage of a helicopter.

3. The method of claim 2 wherein the step of establishing a vibration model includes the step of establishing said vibration model of Fourier coefficients of unit vibration influence based on a plurality of fight conditions of said helicopter.

4. The method of claim 1 wherein the step of establishing the vibration model includes the steps of:

(a) measuring at at least one location on the supporting structure a change in vibration resulting from a predetermined incremental adjustment $a_b$, of one adjustment type on each blade b, b=0 to B−1 of the plurality of blades;

(b) establishing for said at least one location a relationship between said changes in vibration and the corresponding incremental adjustments ah and unit vibration influence coefficients $x_b$ for each blade b;

(c) transforming said relationship into a Fourier series corresponding to harmonic orders of rotor rotation; and (d) determining the Fourier coefficients of unit vibration influence corresponding to harmonic orders of rotor rotation from said Fourier series for said at least one location.

5. The method of claim 1 wherein the Fourier coefficients of adjustment, of vibration, and of unit vibration influence are all resolved using a Discrete Fourier Transformation.

6. The method of claim 5 wherein the step of establishing the vibration relationship includes the step of establishing a relationship expressed as:

$$v_{p+kB} = u_{p+kB} + x_{p+kB} A_p,$$

where:
p is the harmonic order of rotor rotation from 0 to B−1,
B is the total number of rotating blades,
k is a selected integer,
v is the Fourier coefficient of vibration after a blade adjustment at the harmonic order s=p+kB,
u is the Fourier coefficient of vibration measurement before a blade adjustment at the harmonic order s,
x is the Fourier coefficient of unit vibration influence for the type of blade adjustment at the harmonic order s, and
A is the Fourier coefficient of adjustment for the type of blade adjustment at the harmonic order p.

7. The method of claim 1 wherein the step of determining a value of each selected Fourier coefficient of adjustment includes the step of computing a value of each selected Fourier coefficient of adjustment by minimizing substantially the established vibration relationship at at least the harmonic order of each selected Fourier coefficient.

8. The method of claim 7 wherein the vibration relationship is minimized substantially by the least squares technique.

9. The method of claim 7 wherein the vibration relationship is minimized substantially at harmonic orders expressed as s=p+kB, where p is the harmonic order of the selected Fourier coefficient of adjustment, B is the total number of blades of the plurality, and k is a set of integers including the null set.

10. The method of claim 1 wherein the step of determining a group of minimal sets of blade adjustments includes the steps of:

determining the minimum number of virtual blade adjustments of each type that may be calculated from the determined value of each selected Fourier coefficient of adjustment with a unique solution;

determining all possible blade adjustments of the minimum number for each type from the total number of blades of the plurality;

grouping all said blade adjustment possibilities into minimal sets of virtual blade adjustments for each type; and calculating virtual blade adjustment values of the minimal sets of each group based on the determined value of each selected Fourier coefficient of adjustment of the corresponding group.

11. The method of claim 10 wherein the step of determining a minimal set of virtual blade adjustments from the group of each type includes the steps of:

calculating a vibration value based on the vibration relationship for each of the minimal sets of virtual blade adjustments of a group at at least one harmonic order of rotor rotation other than the harmonic order of the selected Fourier coefficient of adjustment; and selecting a minimal set of blade adjustments from each group based on the calculated values of vibration of the minimal sets of each group.

12. The method of claim 11 wherein the minimal set is selected from a group based on it having the lowest calculated vibration value of the minimal sets of the group.

13. The method of claim 11 including the step of:

using the selected minimal set of virtual blade adjustments of each type to adjust the rotating blades if the calculated vibration value of the selected minimal set is within a predetermined vibration limit.

14. The method of claim 11 wherein the step of selecting a Fourier coefficient of adjustment of claim 1 includes the step of selecting a second Fourier coefficient of adjustment from the blade adjustment type set if the calculated vibration value of the corresponding selected minimal set exceeds a predetermined vibration limit; and including the step of repeating the last three steps of the method of claim 1 using both selected Fourier coefficients to expand the minimal set of blade adjustments for the blade adjustment type.

15. The method of claim 14 including the steps of:

selecting an additional Fourier coefficient of adjustment each time the calculated vibration value of the expanded minimal set of blade adjustments exceeds the predetermined vibration limit until all of the Fourier coefficients of adjustment of a blade adjustment type set have been selected; and repeating the last three steps of the method of claim 1 using all of the selected Fourier coefficients to expand the minimal set of blade adjustments for the blade adjustment type.

16. The method of claim 1 wherein the Fourier coefficient of adjustment of the fundamental harmonic order is selected from each blade adjustment type set; and wherein the minimal set of virtual blade adjustments for the Fourier coefficient of adjustment of the fundamental harmonic order is determined based on its affect on the vibration relationship at at least the second harmonic order of rotor rotation.

17. The method of claim 1 wherein the Fourier coefficient of adjustment of a harmonic order other than the fundamental is selected from each blade adjustment type set; and wherein the minimal set of virtual blade adjustments for the Fourier coefficient of adjustment of the other harmonic order is determined based on its affect on the vibration relationship at at least the fundamental harmonic order of rotor rotation.

18. The method of claim 17 wherein the Fourier coefficient of adjustment of the second harmonic order is selected from each blade adjustment type set; and wherein the minimal set of virtual blade adjustments for the Fourier coefficient of adjustment of the second harmonic order is determined based on its affect on the vibration relationship at at least the fundamental harmonic order of rotor rotation.

19. A method of determining a minimal set of rotor blade adjustments for a rotor to which a plurality of rotating blades are attached, said rotor being supported by a supporting structure, said set of adjustments for reducing track deviation of said rotating blades while maintaining vibration of said supporting structure over at least one harmonic order of rotor rotation within an acceptable limit, said method comprising the steps of:

providing measurements of vibration at predetermined locations on said supporting structure;

resolving said vibration measurements into a corresponding set of Fourier coefficients of vibration for at least one of said locations, each Fourier coefficient of vibration of said set corresponding to a harmonic order of rotor rotation;

providing measurements of track of said rotating blades;

resolving said track measurements into corresponding Fourier coefficients of track that correspond to harmonic orders of rotor rotation;

establishing a vibration model of said supporting structure comprising Fourier coefficients of unit vibration influence for said at least one location, said Fourier coefficients of unit vibration influence corresponding to harmonic orders of rotor rotation;

establishing a track model for said rotating blades comprising Fourier coefficients of unit track influence, said Fourier coefficients of unit track influence corresponding to harmonic orders of rotor rotation;

establishing a set of Fourier coefficients of adjustment for at least one blade adjustment type, said set of Fourier coefficients of adjustment corresponding to a set of blade adjustments associated with each blade adjustment type, said Fourier coefficients of adjustment corresponding to harmonic orders of rotor rotation;

selecting at least one Fourier coefficient of adjustment from each blade adjustment type set;

establishing a relationship by which vibration of said supporting structure may be calculated at harmonic orders of rotor rotation from said Fourier coefficients of adjustment, said Fourier coefficients of unit vibration influence and said Fourier coefficients of vibration measurements;

establishing a relationship by which track of said rotating blades may be calculated at harmonic orders of rotor rotation from said Fourier coefficients of adjustment, said Fourier coefficients of unit track influence and said Fourier coefficients of track measurements;

determining a value of each selected Fourier coefficient of adjustment that provides a desired virtual reduction of track deviation of said rotating blades at the harmonic order of each selected Fourier coefficient of adjustment using said track relationship;

determining a group of minimal sets of virtual blade adjustments for each type based on said determined value of each selected Fourier coefficient of adjustment; and determining a minimal set of virtual blade adjustments from said group of each type based on its affect on the vibration relationship at least one harmonic order of rotor rotation other than said harmonic order of each selected Fourier coefficient of adjustment.

20. The method of claim 19 wherein the vibration model is established for a supporting structure comprising a fuselage of a helicopter.

21. The method of claim 20 wherein the step of establishing a vibration model includes the step of establishing said vibration model of Fourier coefficients of unit vibration influence based on a plurality of fight conditions of said helicopter.

22. The method of claim 19 wherein the step of providing measurements of track includes the step of providing measurements of blade height during rotation with respect to a reference point; and wherein the step of resolving said track measurements includes the step of resolving said height measurements into corresponding Discrete Fourier coefficients of height.

23. The method of claim 19 wherein the step of establishing the track model includes the steps of:

(a) measuring a change in blade height of each blade b resulting from a predetermined incremental adjustment ah of one adjustment type on each blade b, b=0 to B−1 of the plurality of blades;

(b) establishing a relationship between said changes in height and the corresponding incremental adjustments $a_b$ and unit track influence coefficients δ for each blade b;

(c) transforming said relationship into a Fourier series corresponding to harmonic orders of rotor rotation; and (d) determining the Fourier coefficients of unit track influence corresponding to harmonic orders of rotor rotation from said Fourier series.

24. The method of claim 19 wherein the Fourier coefficients of adjustment, of vibration, of height, of unit track influence and of unit vibration influence are all resolved using a Discrete Fourier Transformation.

25. The method of claim 24 wherein the step of establishing the track relationship includes the step of establishing a relationship expressed as:

$$Z_p = Y_p + \Delta_p A_p,$$

where:

p is the harmonic order of rotor rotation from 0 to B−1,

Z is the Fourier coefficient of height after a blade adjustment at the harmonic order p, Y is the Fourier coefficient of height measurement before a blade adjustment at the harmonic order p, Δ is the Fourier coefficient of unit track influence for the type of blade adjustment at the harmonic order p, and A is the Fourier coefficient of adjustment for the type of blade adjustment at the harmonic order p.

26. The method of claim 19 wherein the step of determining a value of each selected Fourier coefficient of adjustment includes the step of computing a value of each selected Fourier coefficient of adjustment by minimizing substantially the established track relationship at at least the harmonic order of each selected Fourier coefficient.

27. The method of claim 26 wherein the track relationship is minimized substantially by the least squares technique.

28. The method of claim 26 wherein the track relationship is minimized substantially at the harmonic order of each selected Fourier coefficient of adjustment.

29. The method of claim 19 wherein the step of determining a group of minimal sets of blade adjustments includes the steps of:

determining the minimum number of virtual blade adjustments of each type that may be calculated from the determined value of each selected Fourier coefficient of adjustment with a unique solution;

determining all possible blade adjustments of the minimum number for each type from the total number of blades of the plurality;

grouping all said blade adjustment possibilities into minimal sets of virtual blade adjustments for each type; and calculating virtual blade adjustment values of the minimal sets of each group based on the determined value of each selected Fourier coefficient of adjustment of the corresponding group.

30. The method of claim 29 wherein the step of determining a minimal set of virtual blade adjustments from the group of each type includes the steps of:

calculating a vibration value based on the vibration relationship for each of the minimal sets of virtual blade adjustments of a group at at least one harmonic order of rotor rotation other than the harmonic order of the selected Fourier coefficient of adjustment; and selecting a minimal set of blade adjustments from each group based on the calculated values of vibration of the minimal sets of each group.

31. The method of claim 30 wherein the minimal set is selected from a group based on it having the lowest calculated vibration value of the minimal sets of the group.

32. The method of claim 30 including the step of:
using the selected minimal set of virtual blade adjustments of each type to adjust the rotating blades if the calculated vibration value of the selected minimal set is within a predetermined vibration limit.

33. The method of claim 30 wherein the step of selecting a Fourier coefficient of adjustment of claim 19 includes the step of selecting a second Fourier coefficient of adjustment from the blade adjustment type set if the calculated vibration value of the corresponding selected minimal set exceeds a predetermined vibration limit; and including the step of repeating the last three steps of the method of claim 19 using both selected Fourier coefficients to expand the minimal set of blade adjustments for the blade adjustment type.

34. The method of claim 33 including the steps of:
selecting an additional Fourier coefficient of adjustment each time the calculated vibration value of the expanded minimal set of blade adjustments exceeds the predetermined vibration limit until all of the Fourier coefficients of adjustment of a blade adjustment type set have been selected; and repeating the last three steps of the method of claim 19 using all of the selected Fourier coefficients to expand the minimal set of blade adjustments for the blade adjustment type.

35. The method of claim 19 wherein the Fourier coefficient of adjustment of a harmonic order other than the fundamental harmonic order is selected from each blade adjustment type set; and wherein the minimal set of virtual blade adjustments for the selected Fourier coefficient of adjustment of the fundamental harmonic order is determined based on its affect on the vibration relationship at at least the fundamental harmonic order of rotor rotation.

36. The method of claim 35 wherein the Fourier coefficient of adjustment of the second harmonic order is selected from each blade adjustment type set; and wherein the minimal set of virtual blade adjustments for the Fourier coefficient of adjustment of the second harmonic order is determined based on its affect on the vibration relationship at at least the fundamental harmonic order of rotor rotation.

* * * * *

UNITED STATES PATENT AND TRADEMARK OFFICE
CERTIFICATE OF CORRECTION

PATENT NO. : 6,415,206 B1
DATED : July 2, 2002
INVENTOR(S) : C. Samuel Ventres

It is certified that error appears in the above-identified patent and that said Letters Patent is hereby corrected as shown below:

Column 18,
Line 64, "ah" should read -- $a_b$ --.

Signed and Sealed this

Eighteenth Day of March, 2003

JAMES E. ROGAN
*Director of the United States Patent and Trademark Office*